United States Patent
Corsetti et al.

(10) Patent No.: US 9,157,528 B2
(45) Date of Patent: Oct. 13, 2015

(54) BRAKE MECHANISM FOR A HYBRID TRANSMISSION

(71) Applicant: GM GLOBAL TECHNOLOGY OPERATIONS LLC, Detroit, MI (US)

(72) Inventors: Anthony J. Corsetti, Rochester Hills, MI (US); Goro Tamai, West Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 76 days.

(21) Appl. No.: 14/032,463

(22) Filed: Sep. 20, 2013

(65) Prior Publication Data

US 2014/0102251 A1    Apr. 17, 2014

Related U.S. Application Data

(60) Provisional application No. 61/713,662, filed on Oct. 15, 2012.

(51) Int. Cl.
| | |
|---|---|
| *F16H 63/34* | (2006.01) |
| *B60K 6/48* | (2007.10) |
| *B60W 10/18* | (2012.01) |
| *F16D 63/00* | (2006.01) |
| *F16D 67/02* | (2006.01) |
| *B60K 6/38* | (2007.10) |
| *F16D 121/04* | (2012.01) |
| *F16D 121/20* | (2012.01) |

(52) U.S. Cl.
CPC .............. *F16H 63/3416* (2013.01); *B60K 6/48* (2013.01); *B60W 10/182* (2013.01); *F16D 63/006* (2013.01); *F16H 63/3441* (2013.01); *B60K 2006/381* (2013.01); *F16D 67/02* (2013.01); *F16D 2121/04* (2013.01); *F16D 2121/20* (2013.01); *Y02T 10/6221* (2013.01); *Y10T 74/19051* (2015.01)

(58) Field of Classification Search
CPC ............. F16D 63/006; F16H 63/3441; B60W 10/182; B60K 2006/381
See application file for complete search history.

(56) References Cited

U.S. PATENT DOCUMENTS

| | | | | |
|---|---|---|---|---|
| 3,400,797 A | * | 9/1968 | Horn et al. ...................... | 192/90 |
| 3,856,119 A | * | 12/1974 | Harrington .................. | 188/82.3 |
| 5,131,510 A | * | 7/1992 | Jamrus et al. ................. | 188/171 |
| 5,299,676 A | * | 4/1994 | Wade .......................... | 192/223.3 |
| 5,366,053 A | * | 11/1994 | Yant ........................... | 192/219.2 |

(Continued)

FOREIGN PATENT DOCUMENTS

GB          2 152 157 A    *    7/1985

*Primary Examiner* — Rodney H Bonck
(74) *Attorney, Agent, or Firm* — Quinn Law Group, PLLC

(57) ABSTRACT

A brake mechanism includes a clutch unit and a disc. The clutch unit includes a first and second engagement mechanism. Each engagement mechanism presents at least one tooth. The disc defines at least one slot. Each engagement mechanism is movable relative to the disc between a disengaged position and an engaged position. The tooth of the first engagement mechanism is configured to engage the slot of the disc when in the engaged position to cease rotation of the disc in a first direction of rotation. The tooth of the second engagement mechanism is configured to engage the slot of the disc when in the engaged position to cease rotation of the disc in a second direction of rotation, opposite the first direction of rotation. The disc is configured to rotate about an axis of rotation, relative to the clutch unit, when each engagement mechanism is in the disengaged position.

20 Claims, 10 Drawing Sheets

(56) References Cited

U.S. PATENT DOCUMENTS

| | | | |
|---|---|---|---|
| 7,766,790 B2* | 8/2010 | Stevenson et al. | 477/8 |
| 8,540,065 B2* | 9/2013 | Samie et al. | 192/43.1 |
| 2004/0159517 A1* | 8/2004 | Thomas | 192/39 |
| 2007/0272509 A1* | 11/2007 | Peschek et al. | 192/90 |
| 2011/0186400 A1* | 8/2011 | Villeneuve | 192/219.5 |

* cited by examiner

BRAKE MECHANISM FOR A HYBRID TRANSMISSION

CROSS-REFERENCE TO RELATED APPLICATIONS

This application claims priority to U.S. Provisional Patent Application No. 61/713,662, filed on Oct. 15, 2012, which is hereby incorporated by reference in its entirety.

TECHNICAL FIELD

The present disclosure relates to a brake mechanism for a hybrid transmission.

BACKGROUND

To produce a more efficient vehicle, hybrid vehicle powertrains combine an electric motor and a conventional internal combustion engine. Torque from the engine and the electric motor is typically channeled to the vehicle's driven wheels via a transmission. Efficiency of a hybrid vehicle powertrain is generally related to the percentage of time that the engine must be run in addition to or in place of the electric motor for powering the vehicle.

Some hybrid powertrains employ a single electric motor in combination with the engine. In such powertrains, transmission output, as well as vehicle speed, is directly related to the speeds and torques of the engine and the electric motor. Other hybrid powertrains employ two electric motors in combination with the engine to power the vehicle. Additionally, a vehicle may employ purely electric propulsion. In such a case, the vehicle's powertrain will have one or more motor/generators and no internal combustion engine.

In either a hybrid or purely electric powertrain, the electric motors are operatively connected to a transmission which includes planetary gearing such that torque and speed of the electric motors may be selected independently of vehicle speed and desired acceleration. In a hybrid powertrain, control of the engine is typically achieved by varying individual torque contribution from the electric motor(s). Thus, such hybrid and purely electric powertrains may each provide selectable torque contribution from their electric motors, and, in the case of the hybrid powertrain, may similarly provide a selectable torque contribution from the engine to drive the subject vehicle.

SUMMARY

A brake mechanism for a hybrid transmission includes a clutch unit and a disc. The clutch unit surrounds an axis of rotation. The clutch unit includes a first engagement mechanism and a second engagement mechanism, each surrounding the axis of rotation. Each of the first and second engagement mechanisms presents at least one tooth. The disc surrounds the axis of rotation, wherein the disc defines at least one slot. Each of the first and second engagement mechanisms is movable relative to the disc between a disengaged position and an engaged position. The tooth of the first engagement mechanism is configured to engage the slot of the disc when in the engaged position to cease rotation of the disc in a first direction of rotation. The tooth of the second engagement mechanism is configured to engage the at least one slot of the disc when in the engaged position to cease rotation of the disc in a second direction of rotation, opposite the first direction of rotation. The disc is configured to rotate about the axis of rotation, relative to the clutch unit, when each of the first and second engagement mechanisms is in the disengaged position.

In another aspect, a hybrid transmission includes an input shaft, at least one electric motor/generator, a gear set, and a brake mechanism. The input shaft and the gear set are rotatable about an axis of rotation. The brake mechanism includes a clutch unit and a disc. The clutch unit surrounds the axis of rotation. The clutch unit includes a first engagement mechanism and a second engagement mechanism, each surrounding the axis of rotation. Each of the first and second engagement mechanisms presents at least one tooth. The disc surrounds the axis of rotation and the disc defines at least one slot. Each of the first and second engagement mechanisms is movable relative to the disc between a disengaged position and an engaged position. The at least one tooth of the first engagement mechanism is configured to engage the at least one slot of the disc when in the engaged position to cease rotation of the disc in a first direction of rotation. The at least one tooth of the second engagement mechanism is configured to engage the at least one slot of the disc when in the engaged position to cease rotation of the disc in a second direction of rotation, opposite the first direction of rotation. The disc is configured to rotate about the axis of rotation, relative to the clutch unit, when each of the first and second engagement mechanisms is in the disengaged position.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
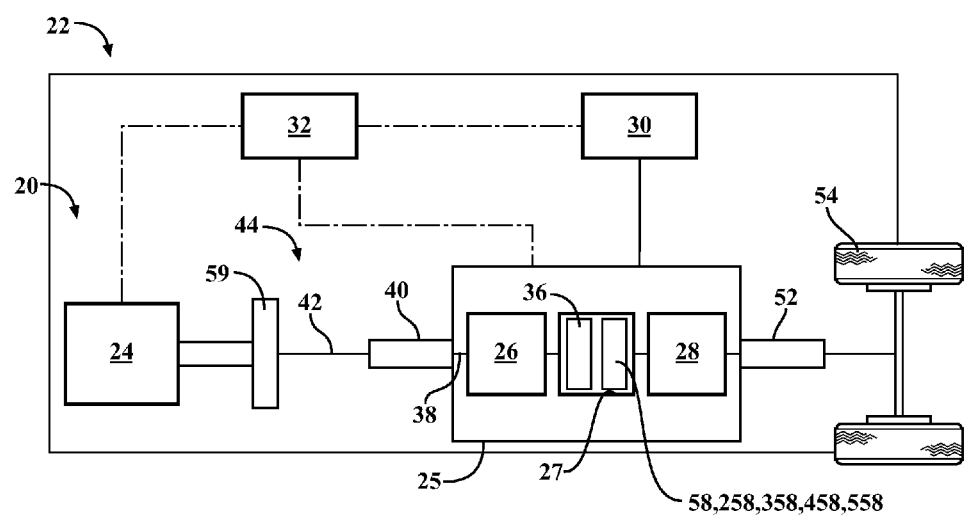
FIG. 1 is a schematic illustration of a vehicle having a hybrid transmission and a controller which controls a brake mechanism within the hybrid transmission.

Referring to the drawings, wherein like reference numbers refer to like components, FIG. 1 illustrates a hybrid powertrain 20 configured to launch and propel a vehicle 22, i.e., to operate the vehicle 22 in all speed ranges between low and high road speeds. The hybrid powertrain 20 may include multiple power sources, which include an internal combustion engine 24 and a hybrid transmission 25. The hybrid transmission 25 may include a first motor/generator 26 and a second motor/generator 28 and an "electrically variable transmission" (EVT) 27.

The powertrain 20 additionally has an energy storage system 30 that includes one or more batteries that are not specifically shown, but known by those skilled in the art. The energy storage system 30 is operatively connected to the first and second motor/generators 26, 28 such that the motor/generators 26, 28 may transfer torque to or receive torque from the engine. It should be appreciated that there could be more or less than two motor/generators 26, 28. The powertrain 20 also includes a controller 32 or an electronic control unit (ECU). The controller 32 is operatively connected to the power sources and to the energy storage system 30 to control the distribution of torque from the power sources to the EVT 27.

The EVT 27 includes a transmission planetary gear train operatively connected to each of the engine and the motor/generators 26, 28. Channeling respective torques of the engine and the motor/generators 26, 28 to different members of the planetary gear train permits one of the power sources to either assist or balance the operation of any of the other two. Thus, the combination of one engine and the motor/generators 26, 28 operatively connected to the EVT 27 allows speeds and torques of the engine and the motor/generators 26, 28 to be controlled and selected independently in order to power the vehicle 22 more efficiently.

Although the hybrid powertrain 20 shown in FIG. 1 includes the engine, the EVT 27 may also be connectable solely to the motor/generators 26, 28. In such a case, the powertrain 20 would no longer be a hybrid type, but would become purely electric, and the EVT 27 may then be broadly described as an electro-mechanical drive unit. For simplicity and clarity, the remainder of the present description will refer to the electro-mechanical drive unit as the EVT 27 being connected to the engine as well as to the motor/generators 26, 28.

Referring to FIG. 1, the EVT 27 may include one or more planetary gear sets 36. Each planetary gear set 36 may be an individual planetary gear set 36, a compound planetary gear arrangement having two or more interconnected planetary gear sets 36, or an external gear set. The engine the motor/generators 26, 28, and the gear set may be disposed on an axis of rotation 38.

Referring again to FIG. 1, the engine and the motor/generators 26, 28 are operatively connected to the EVT 27 via an input arrangement 44 which transmits torque from the engine to a transmission input member 40. The input arrangement 44 includes an output shaft 42 of the engine which also serves as the input member 40 to the hybrid transmission 25. The input member 40 is disposed on, and is rotatable about, the axis of rotation 38 in order to provide engine torque to the EVT 27. The EVT 27 also includes a transmission output member 52, disposed on the axis of rotation 38. The transmission output member 52 is continuously connected to a set of drive wheels 54 and is configured to provide output torque received from the EVT 27 to the drive wheels 54 to launch and propel the vehicle 22.

As seen in FIG. 1, the transmission also includes a stationary member, such as a transmission case 34 or housing 56. The EVT 27 may also include a brake mechanism 58, as shown in FIGS. 2-5 and explained in more detail below. Accordingly, the brake mechanism 58 may be used to stop rotation of the planetary gear set 36 about the axis of rotation 38, relative to the housing 56.

As shown in FIG. 1, the EVT 27 may also include a damper 59. The damper 59 may be operatively connected to the engine and is configured to absorb torsional vibrations generated by the engine before such vibrations are transmitted to the planetary gear set 36 via the input member 40.

As shown in FIGS. 2-5, the brake mechanism 58 is configured to operate as a double dog clutch, disposed on the axis of rotation 38. The brake mechanism 58 includes a clutch unit 60 and a disc 46. The clutch unit 60 is fixed to the housing 56 while also radially surrounding the axis of rotation 38. Therefore, by virtue of the attachment of the clutch unit 60 to the housing 56, the clutch unit 60 does not rotate about the axis of rotation 38.

The clutch unit 60 includes a case 34, a first engagement mechanism 48, and a second engagement mechanism 50. The case 34 includes a first wall 62, a second wall 64, a connecting wall 66, a first lip 68, and a second lip 70, which combine to define a chamber 72 which radially surrounds the input shaft and, thus, the axis of rotation 38. The first and second walls 62, 64 extend radially from the axis of rotation 38. The first wall 62 extends in axially spaced and parallel relationship to the second wall 64. The connecting wall 66 circumferentially surrounds the axis of rotation 38 and axially interconnects the first wall 62 and the second wall 64. The first lip 68 and the second lip 70 circumferentially surround the axis of rotation 38 and are radially spaced from the connecting wall 66 such that the first and second lip 68, 70 are closer to the axis of rotation 38 than the connecting wall 66. The first and second lips 68, 70 axially extend toward one another to define an axial gap 74 therebetween. Therefore, the first and second walls 62, 64, the connecting wall 66, and the first and second lips 68, 70 cooperate to form a generally C-shaped cross-section, that, when translated 360 degrees about the axis of rotation 38, defines a doughnut shaped cavity.

The disc 46 radially extends from, and is rotatably attached to, the input shaft. The disc 46 may be in splined engagement with the input shaft. The disc 46 radially extends through the gap defined between the first and second lips 68, 70, into the cavity. The disc 46 is configured to rotate relative to the case 34, about the axis of rotation 38, in response to rotation of the input shaft. More specifically, the disc 46 may rotate in a clockwise direction 76 or a counterclockwise direction 78. The disc 46 presents a first surface 80 and a second surface 82, opposing the first surface 80. The first surface 80 defines a plurality of first slots 84 and the second surface 82 defines a plurality of second slots 86. The first and second slots 84, 86 are circumferentially spaced from one another and radially surround the axis of rotation 38. Each slot 84, 86 may be defined by a recessed ramp 88, a recessed floor 90, and a recessed barrier wall 92. As viewed in cross-section, the recessed ramp 88 extends in a generally diagonal direction to the recessed floor 90 and the recessed barrier wall 92 extends generally perpendicularly from the respective surface 80, 82 to the recessed floor 90. The recessed floor 90 extends between the recessed ramp 88 and the recessed barrier wall 92 to define each of the first and second slots 84, 86, each having a quadrilateral shape. Additionally, the first and second slots 84, 86 defined in the respective first and second surfaces 80, 82 of the disc 46 are axial, circumferential mirror images of one another.

Figure 2:
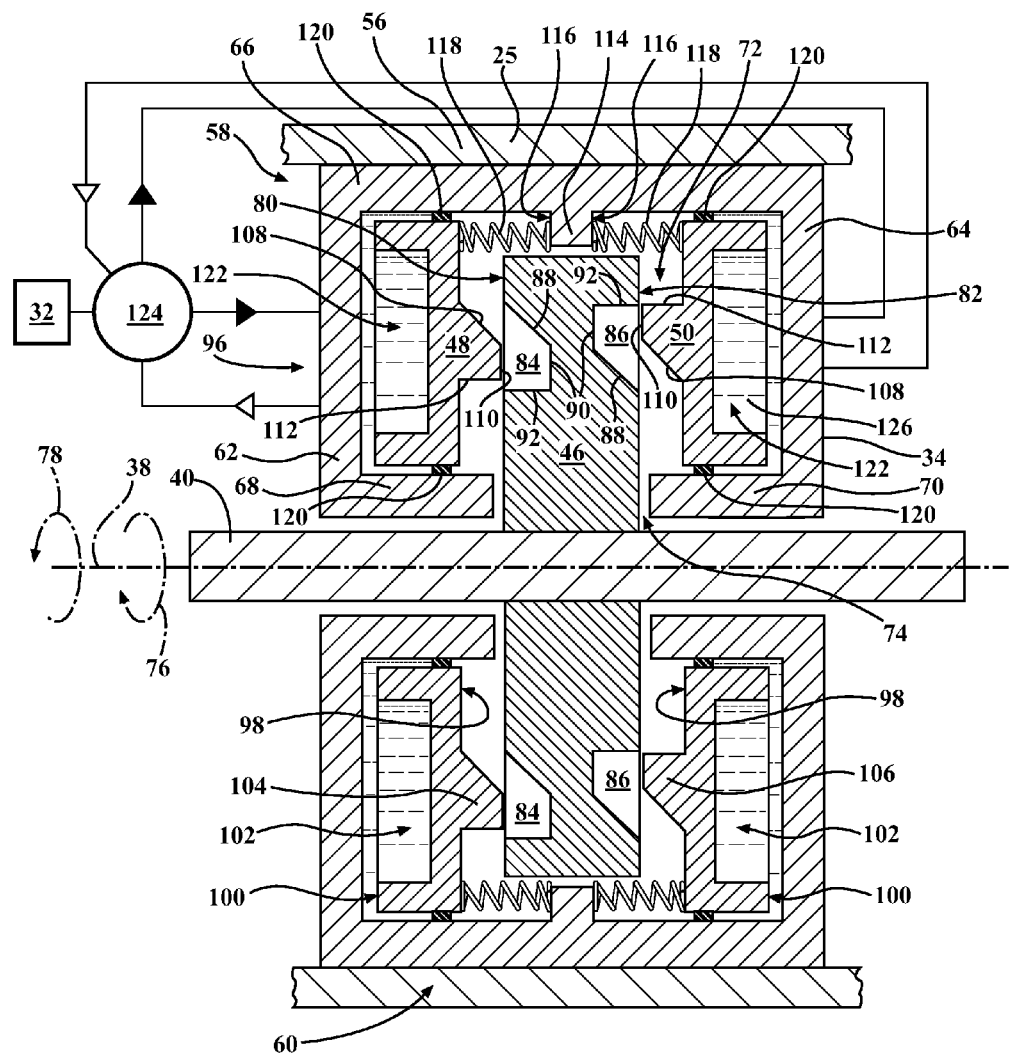
FIG. 2 is a schematic cross-sectional side view of the brake mechanism disposed in the hybrid transmission, with the brake mechanism in a disengaged position.
Figure 3:
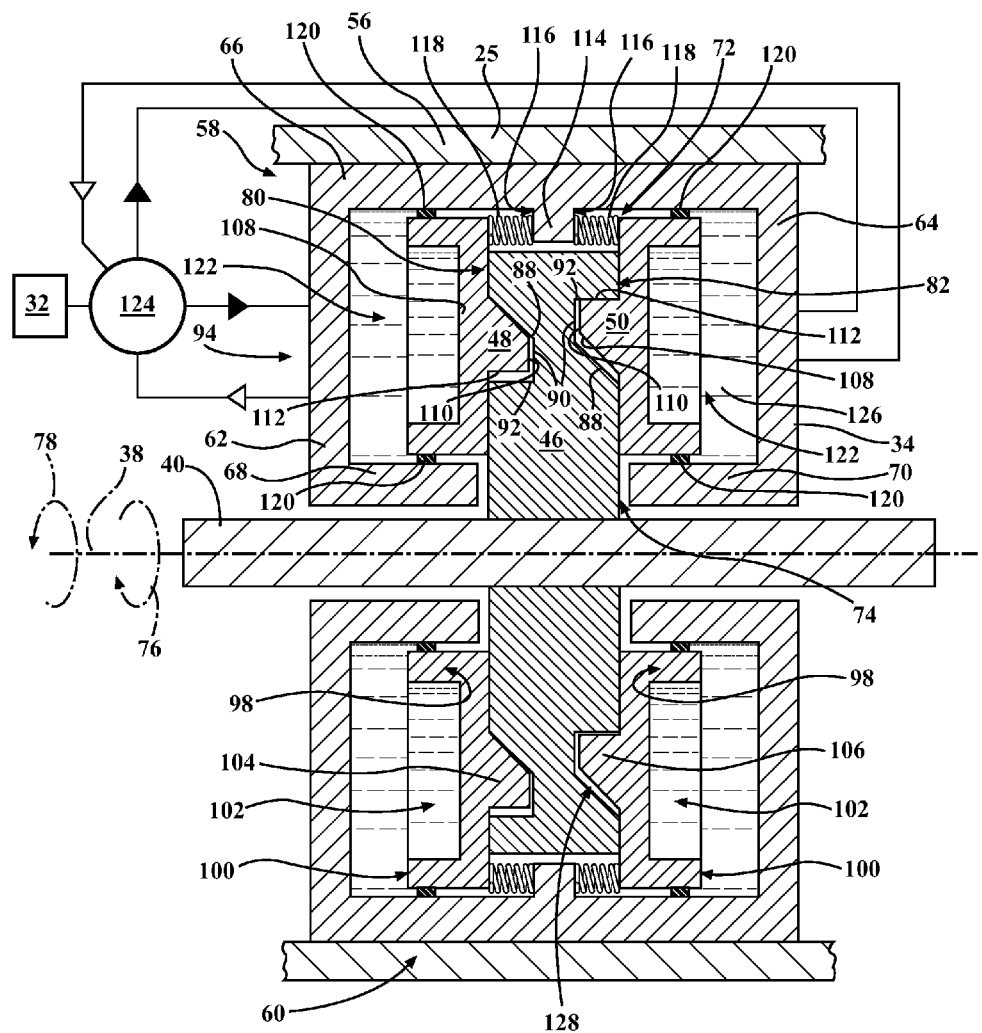
FIG. 3 is a schematic cross-sectional side view of the brake mechanism disposed in the hybrid transmission, with the brake mechanism in an engaged position.
Figure 4:
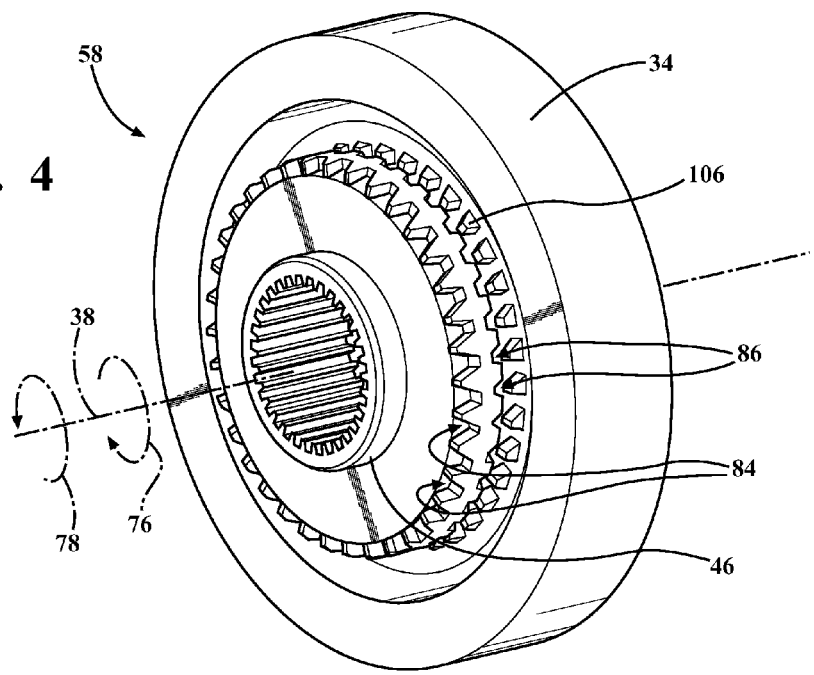
FIG. 4 is a schematic perspective view of the brake mechanism partially cut away, illustrating the brake mechanism in the disengaged position.
Figure 5:
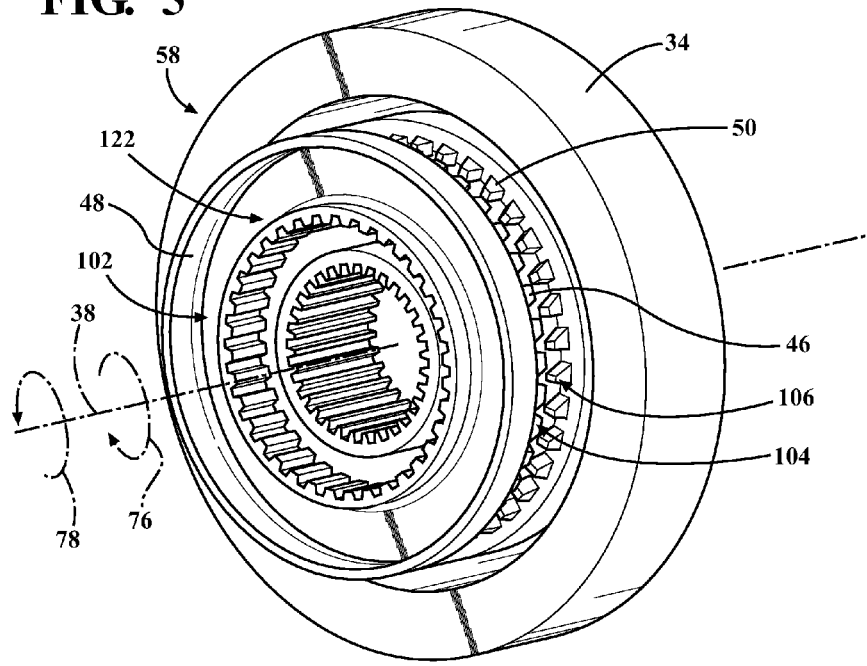
FIG. 5 is a schematic perspective view of the brake mechanism partially cut away, illustrating the brake mechanism in the engaged position.

The first and second engagement mechanisms 48, 50 are disposed in the chamber 72 and radially surround the axis of rotation 38. The first and second engagement mechanisms 48, 50 are axially spaced from one another such that the disc 46 is axially disposed therebetween. Each engagement mechanism 48, 50 is disposed in the chamber 72 and is movable axially between a disengaged position 94, as shown in FIG. 2, and an engaged position 96, as shown in FIG. 3, as explained in more detail below. Each engagement mechanism 48, 50 presents an inner surface 98 and an outer surface 100, axially opposing the inner surface 98. The outer surface 100 of each of the first and second engagement mechanisms 48, 50 faces the respective first and second wall 62, 64 and also defines a groove 102 that circumferentially surrounds the axis of rotation 38. Likewise, the inner surfaces 98 face the respective first and second surface 80, 82 of the disc 46. A plurality of circumferentially spaced first teeth 104 and second teeth 106 axially extend from the inner surface 98 of the respective first and second engagement mechanisms 48, 50. The teeth 104, 106 are configured to have a generally complimentary shape of the respective slots 84, 86 such that each slot 84, 86 is configured to receive a corresponding tooth 104 therein. Therefore, each of the teeth 104, 106 includes an engagement ramp 108, an engagement floor 110, and an engagement barrier wall 112. The engagement ramp 108 extends generally diagonally from the inner surface 98 of the engagement mechanism 48 to the engagement floor 110 and the engagement barrier wall 112 extends generally perpendicularly from the inner surface 98 of the engagement mechanism 48 to the engagement floor 110. The engagement floor 110 interconnects the engagement ramp 108 and the engagement barrier wall 112. Additionally, the teeth 104, 106 extending from the inner surface 98 of one of the engagement mechanisms 48, 50 are circumferential mirror images of the teeth 104, 106 extending from the inner surface 98 of other engagement mechanism 48, 50.

A protrusion 114 extends from the connecting wall 66, into the cavity such that the protrusion 114 extends between the connecting wall 66 and the disc 46. The protrusion 114 presents opposing reaction surfaces 116, which are axially opposed to one another. A biasing device 118 is disposed between each reaction surface 116 and the inner surface 98 of the respective first and second engagement mechanism 48, 50. The biasing device 118 may be a spring, such as a coil spring. The biasing device 118 applies an axial load on the engagement mechanism 48 to axially bias the engagement mechanism 48 away from the disc 46 and into the disengaged position 94.

Seals 120 are radially disposed between each of the engagement mechanisms 48, 50 and the respective connecting wall 66, the first lip 68, and the second lip 70. The grooves 102 defined in the engagement mechanisms 48, 50, the respective first and second walls 62, 64, and the seals 120 cooperate to define pressure cavities 122 therebetween. The brake mechanism 58 is operatively attached to a pump, such as a lube pump 124. The pump is configured to supply fluid 126, such as oil and the like, into the pressure cavities 122 through ports (not shown). The pump is also operatively attached to the controller 32. Therefore, when it is desired to stop rotation of the input shaft, the controller 32 sends a signal to the pump to supply fluid 126 to pressurize the pressure cavities 122. When pressure within the pressure cavity 122 is increased to a predetermined threshold, the corresponding engagement mechanism 48, 50 is axially biased into the engaged position 96 to cease rotation of the disc 46. By way of a non-limiting example, fluid 126 from the pump may provide approximately 0.8 bars of pressure within the pressure cavity 122, such that at least 25 foot pounds (lbf) of force acts on the engagement mechanism 48, 50.

When the engagement mechanisms 48, 50 are in the engaged position 96, as shown in FIG. 3, the first and second teeth 104, 106 are in engagement with the corresponding first and second slots 84, 86 to prevent rotation of the disc 46, relative to the case 34. When, for example, the input shaft is rotating the disc 46 in the clockwise direction 76, the recessed ramp 88 of the first slots 84 defined in the first surface 80 of the disc 46 are in contact with the engagement ramp 108 of the tooth of the corresponding engagement mechanism 48, 50 and lash 128 is defined between the corresponding recessed barrier walls 92 and engagement barrier walls 112. Likewise, the recessed barrier walls 92 of the second slots 86, defined in the second surface 82 of the disc 46, are in contact with the engagement barrier wall 112 of the second teeth 106 of the second engagement mechanism 50 and lash 128 is defined between the corresponding engagement ramps 108 and recessed ramps 88. Therefore, torque applied in the clockwise locking direction 76 will cause the teeth 104, 106 to remain engaged, even when oil pressure is released. However, a small rotation in the non-locking direction, i.e., the counterclockwise locking direction 78 allows the biasing devices 118 to act on, and retract, the first and second engagement mechanisms 48, 50 to the disengaged position 94, which is facilitated by the taper of the recessed ramps 88 and engagement ramps 108. Therefore, the lash 128 defined between the recessed ramps 88 and the engagement ramps 108 or the recessed barrier walls 92 and the engagement barrier walls 112 is configured such that at least one engagement mechanism 48, 50 will always be retracted by the corresponding biasing device 118 if oil pressure is no longer applied within the pressure cavity 122. As an alternative to the hydraulic actuation described above, it should be appreciated that the engagement mechanisms 48, 50 may be actuated via an electromechanical actuator and the like. It should be appreciated that other actuators may also be used.

Figure 6:
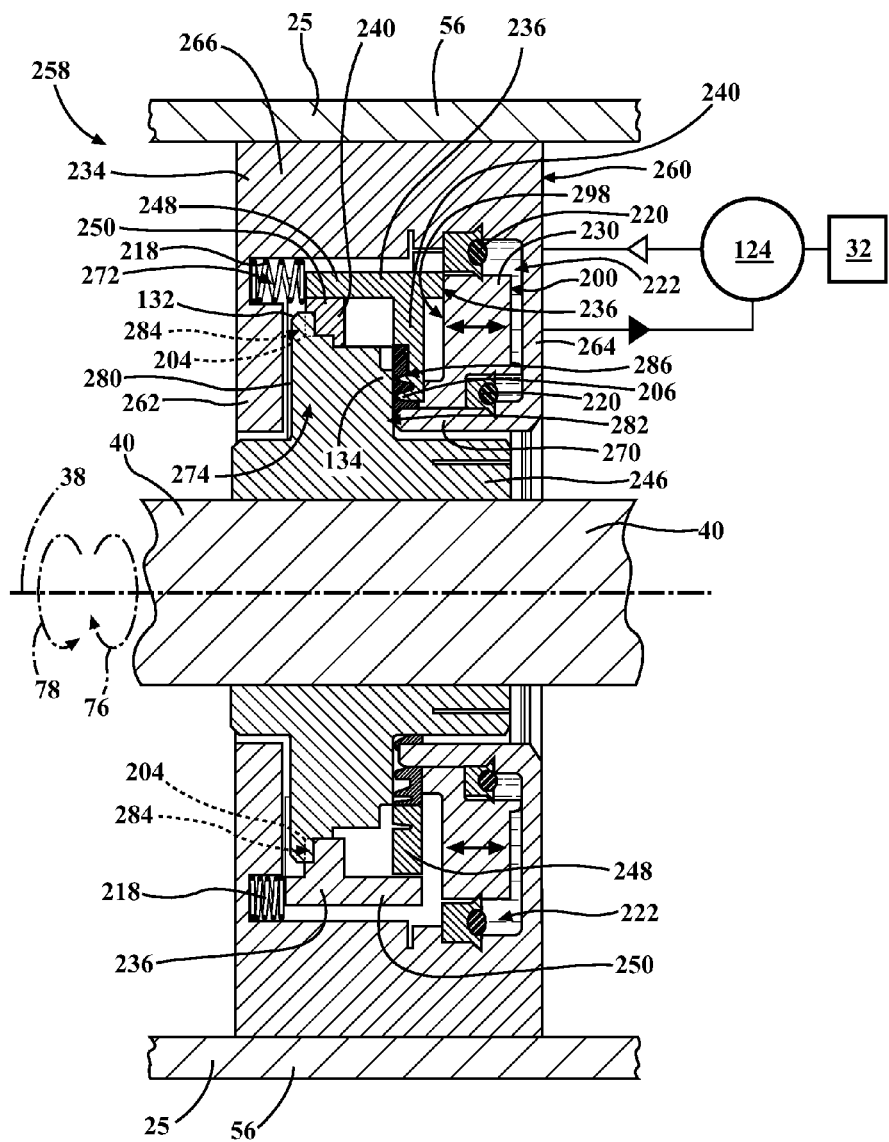
FIG. 6 is a schematic cross-sectional side view of another embodiment of the brake mechanism disposed in the hybrid transmission.
Figure 7:
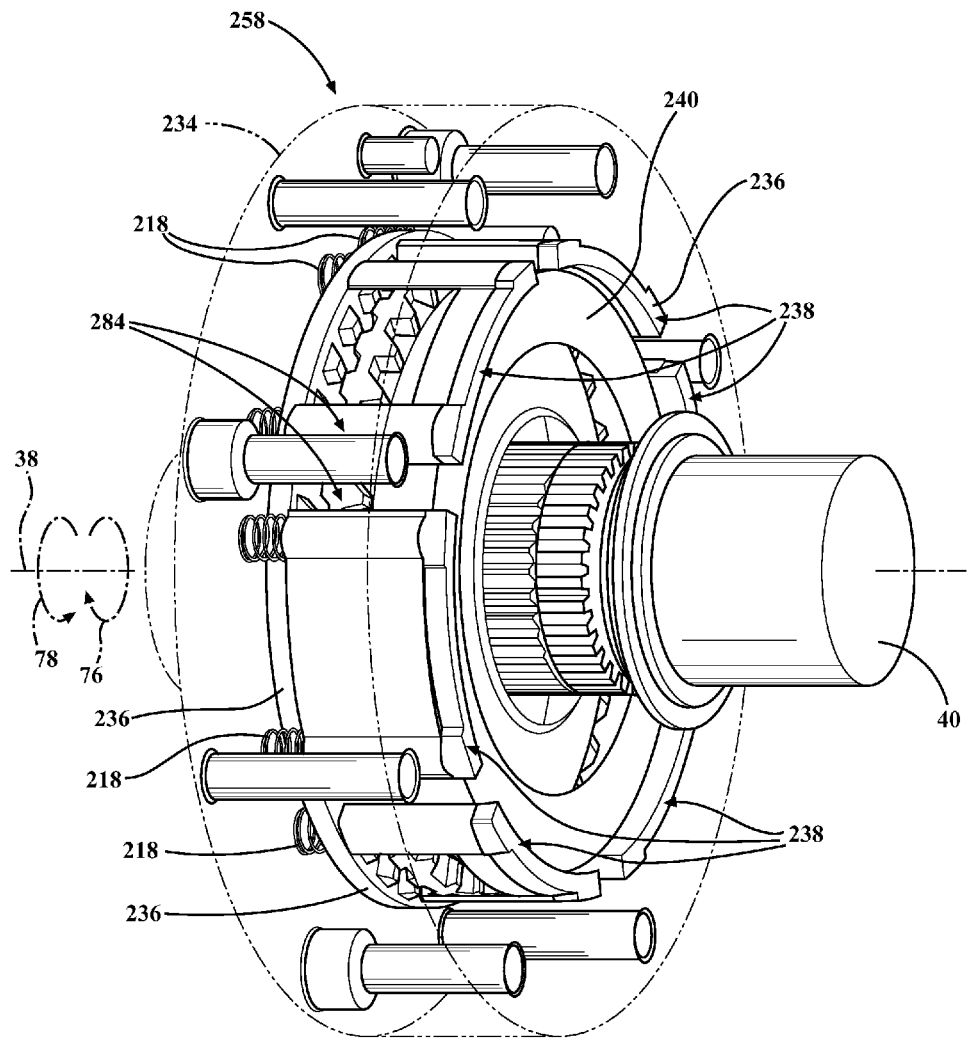
FIG. 7 is a schematic perspective view of the brake mechanism of FIG. 6.

As shown in FIGS. 6 and 7, another embodiment of the brake mechanism 258 is shown. Similar to the previous embodiment, the brake mechanism 258 is also configured to operate as a double dog clutch, disposed on the axis of rotation 38. The brake mechanism 258 includes a clutch unit 260 and a disc 246. The clutch unit 260 is fixed to the housing 56 while also radially surrounding the axis of rotation 38. Therefore, by virtue of the attachment of the clutch unit 260 to the housing 56, the clutch unit 260 does not rotate about the axis of rotation 38.

The clutch unit 260 includes a case 234, a first engagement mechanism 248, a second engagement mechanism 250, and a piston 230. The case 234 includes a first wall 262, a second wall 264, and a connecting wall 266, which combine to define a chamber 272 which radially surrounds the axis of rotation 38. The first and second walls 262, 264 extend radially from the axis of rotation 38. The first wall 262 extends in axially spaced and parallel relationship to the second wall 264. The connecting wall 266 circumferentially surrounds the axis of rotation 38 and axially interconnects the first wall 262 and the second wall 264. A lip 270 axially extends from the second wall 264 in spaced and parallel relationship to the connecting wall 266. The lip 270 axially extends toward the first wall 262 to define an axial gap 274 therebetween. Therefore, the first and second walls 262, 264, the connecting wall 266, and the lip 270 cooperate to form a generally C-shaped cross-section, that, when translated degrees about the axis of rotation 38, defines a doughnut shaped chamber.

The disc 246 radially extends from, and is rotatably attached to, the input member 40. The disc 246 may be in splined engagement with the input member 40. The disc 246 radially extends through the axial gap 274 defined between the first wall 262 and the lip 270, into the chamber. The disc 246 is configured to rotate relative to the case 234, about the axis of rotation 38, in response to rotation of the input member 40. More specifically, the disc 246 may rotate about the axis of rotation 38 in the clockwise direction 76 or the counterclockwise direction 78. The disc 246 presents a first surface 280 and a second surface 282, opposing the first surface 280. The second surface 282 includes a first ring 132 and a second ring 134. The first and second rings 132, 134 are concentric and surround the axis of rotation 38. The first ring 132 is concentric with the second ring 134 such that the second ring 134 has a smaller radius than the first ring 132. Further, the second ring 134 is axially spaced from the first ring 132 such that the second ring 134 is axially disposed between the first ring 132 and the second wall 264. The first ring 132 defines a plurality of circumferentially spaced first slots 284 and the second ring 134 defines a plurality of circumferentially spaced second slots 286 which radially surround the axis of rotation 38.

The piston 230 is axially disposed in the chamber 272 between the second wall 264 of the case 234 and each of the first and second engagement mechanisms 248, 250. The piston 230 radially surrounds the axis of rotation 38. The piston 230 is movable axially, as will be explained in more detail below. The piston 230 presents an inner surface 298 and an outer surface 200, axially opposing the inner surface 298. The outer surface 200 faces the second wall 264. Likewise, the inner surface 298 faces first and second engagement mechanisms 248, 250.

The first and second engagement mechanisms 248, 250 surround the axis of rotation 38 and are concentric with one another. The piston 230 axially abuts each of the first and second engagement mechanisms 248, 250. The first and second engagement mechanisms 248, 250 are movable axially between the engaged position 96 and the disengaged position 94, in response to axial movement of the piston 230. Each engagement mechanism 248, 250 includes a plurality of axially extending stanchions 236. The first and second engagement mechanisms 248, 250 shown in FIGS. 6 and 7 each include three circumferentially spaced stanchions 236. The stanchions 236 are arcuately shaped in the circumferential direction, relative to the axis of rotation 38. The piston 230 is axially disposed between the stanchions 236 and the second wall 264 of the case 234. Each stanchion 236 presents an apply surface 238 which faces the inner wall 298 of the piston 230. The apply surfaces 238 of the stanchions 236 are generally planar with one another. The apply surfaces 238 of the stanchions 236 are in contact relationship with the inner wall 298 of the piston 230. The stanchions 236 of the first engagement mechanism 248 are circumferentially interleaved with the stanchions 236 of the second engagement mechanism 250 such that the stanchions 236 surround the axis of rotation 38 in alternating relationship to one another.

Each the first and second engagement mechanisms 248, 250 also include a band 240 that circumferentially interconnects the respective stanchions 236. More specifically, the band 240 for each engagement mechanism 248, 250 extends radially inwardly toward the axis of rotation 38 from the respective stanchions 236. The band 240 of the first engagement mechanism 248 is disposed in axially spaced and parallel relationship to the band 240 of the second engagement mechanism 250 such that the band 240 of the first engagement mechanism 248 is axially disposed between the band 240 of the second engagement mechanism 250 and the first wall 262. Likewise, the band 240 of the second engagement mechanism 250 is axially disposed between the band 240 of the first engagement mechanism 248 and the second wall 264 of the case 234.

A plurality of circumferentially spaced first teeth 204 axially extend from the band 240 for the first engagement mechanism 248 and a plurality of circumferentially spaced second teeth 206 axially extend from the band 240 for the second engagement mechanism 250. The first and second teeth 204, 206 of the respective band 240 correspond with the respective first and second slots 284, 286 of the disc 246. Therefore, the first teeth 204 of the band 240 for the first engagement mechanism 248 correspond to the first slots 284 of the first disc 246 and the second teeth 206 of the band 240 for the second engagement mechanism 250 correspond to the second slots 286 of the second disc 246. The first and second teeth 204, 206 are configured to have a generally complimentary shape of the respective first and second slots 284, 286 such that the first and second slots 284, 286 are configured to receive a corresponding first and second tooth 204, 206 therein. Additionally, the first teeth 204 extending from the interior surface of the band 240 of the first engagement mechanism 248 are circumferential mirror images of the second teeth 206 extending from the interior surface of the band 240 of the second engagement mechanism 250.

A biasing device 218 is disposed between the first wall 262 of the case 234 and at least one of the stanchions 236 for each of the first and second engagement mechanisms 248, 250, opposite the respective apply surfaces 238. The biasing device 218 may be a spring, such as a coil spring. Each biasing device 218 applies an axial load on the engagement mechanism, via contact with the stanchion 236, to axially bias the engagement mechanisms 248, 250, and thus the piston 230, away from the disc 246 and into the disengaged position 94.

Seals 220 are radially disposed between the piston 230 and the connecting wall 266 and between the piston 230 and the lip 270. The piston 230, the connecting wall 266, the second wall 264, and the lip 270 cooperate to define a pressure chamber 122 therebetween. When pressure within the pressure chamber 122 is increased to a predetermined threshold, pressure acts on the outer surface 200 of the piston 230, and the piston 230 is axially biased toward the disc 246 such that the piston 230, in turn axially moves the respective first and second engagement mechanisms 248, 250 into the engaged position 96 to cease rotation of the disc 246. More specifically, the piston 230 contacts the apply surface 238 of the stanchions 236 of each of the first and second engagement mechanisms 248, 250 to bias the first and second engagement mechanisms 248, 250 into the engaged position 96. By way of a non-limiting example, surface area of the outer surface 200 of the piston 230 is large enough such that fluid 126 from a lube pump 124 may provide approximately 1.0 bar of pressure within the pressure chamber 222 to move the engagement mechanisms 248, 250 into the engaged position 96. As an alternative to the hydraulic actuation described above, it should be appreciated that the engagement mechanisms 248, 250 may be actuated via an electro-mechanical actuator and the like.

When the engagement mechanisms 248, 250 are in the engaged position 96, the first and second teeth 204, 206 are in engagement with the corresponding first and second slots 284, 286 to prevent rotation of the disc 246, relative to the case 234. When, for example, the input member 40 is rotating the disc 246 in the clockwise direction 76, the slots 284, 286 are in contact with the teeth 204, 206 of the corresponding engagement mechanism 248, 250 and lash is defined between the teeth 204, 206 and a wall of the slot 284, 286. Therefore, torque applied in the clockwise locking direction 76 will cause the teeth 204, 206 to remain engaged, even when oil pressure is released. However, a small rotation in the non-locking direction, i.e., the counterclockwise locking direction 78 allows the biasing devices 218 to act on, and retract, the first and second engagement mechanisms 248, 250 to the disengaged position 94, which may be facilitated by a taper of the walls which define the slots 284, 286 and a tapering of the teeth 204, 206. Therefore, the lash defined between the teeth 204, 206 and the slots 284, 286 is configured such that at least one engagement mechanism 248, 258 will always be retracted by the corresponding biasing device 218 if oil pressure is no longer applied within the pressure chamber 222.

Figure 8:
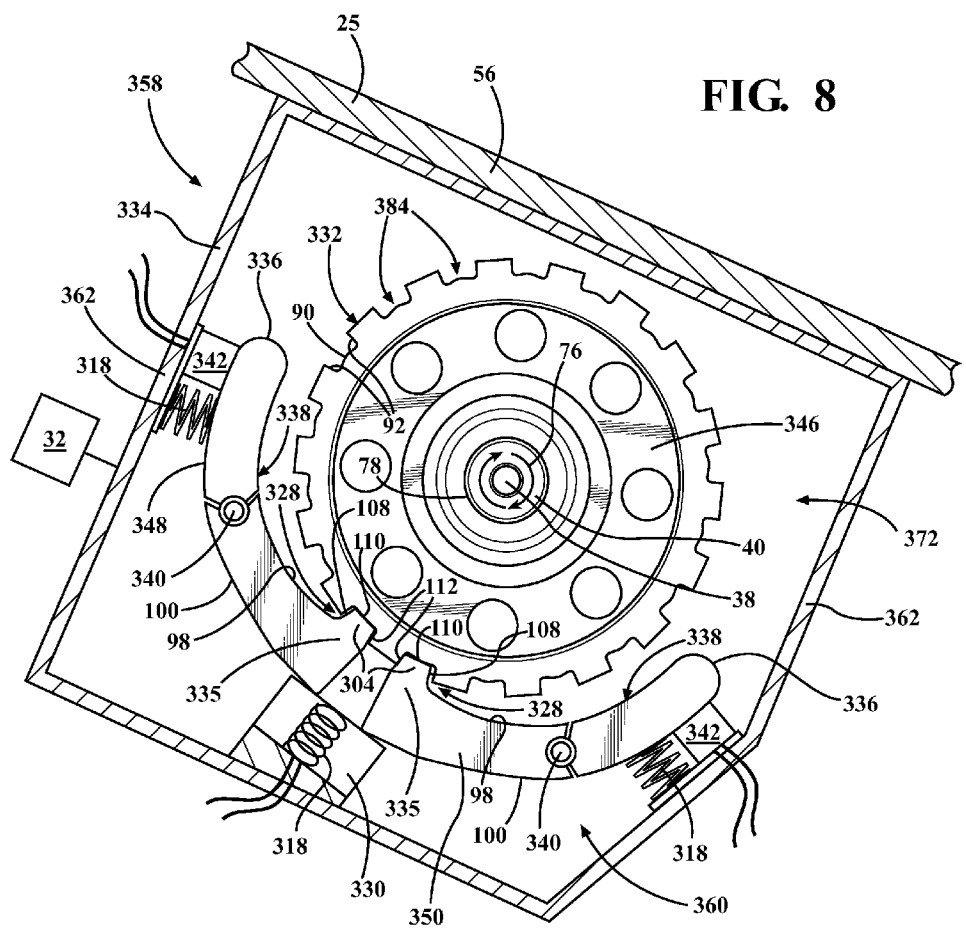
FIG. 8 is a schematic partial cross-sectional end view of another embodiment of the brake mechanism disposed in the hybrid transmission, with the brake mechanism in an engaged position.

Another aspect of the brake mechanism 358 is shown in FIG. 8. The brake mechanism 358 operates as a double dog clutch, disposed on the axis of rotation 38. The brake mechanism 358 includes a clutch unit 360 and a disc 346. The clutch unit 360 is fixed to the housing 56 while also radially surrounding the axis of rotation 38. Therefore, by virtue of the attachment of the clutch unit 360 to the housing 56, the clutch unit 360 does not rotate about the axis of rotation 38.

The clutch unit 360 includes a case 334, a first engagement mechanism 348, a second engagement mechanism 350, and an actuator 330. The case 334 includes at least one wall 362 which defines a chamber 372 therein.

The disc 346 radially extends from, and is rotatably attached to, the input member 40. The disc 346 may be in splined engagement with the input member 40. The disc 346 is disposed in the chamber 372. The disc 346 is configured to rotate relative to the case 34, about the axis of rotation 38, in response to rotation of the input member 40. More specifically, the disc 346 may rotate about the axis of rotation 38 in the clockwise direction 76 or the counterclockwise direction 78. The disc 346 defines a plurality of circumferentially spaced slots 384 which radially surround the axis of rotation 38 and extend radially inwardly from an outer edge 332 of the disc 346. Each slot 384 may be defined by a pair of recessed barrier walls 92 and a recessed floor 90. The recessed floor 90 extends between the barrier walls 92 to define the slot 384 having a generally arcuate, rectangular shape.

The first and second engagement mechanisms 348, 350 are disposed in radially spaced relationship to the axis of rotation 38. Each engagement mechanism 348, 350 may be a pawl having a general arcuate shape extending between an engagement end 335 and a release end 336. The engagement end 335 includes a tooth 304 which extends radially inwardly toward the axis of rotation 38. Each tooth 304 includes an engagement ramp 108, an engagement floor 110, and an engagement barrier wall 112. The engagement ramp 108 extends generally diagonally from an interior surface 338 of the respective engagement mechanism 348, 350 to the engagement floor 110 and the engagement barrier wall 112 extends generally perpendicularly from the interior surface 338 of the respective engagement mechanism 348, 350 to the engagement floor 110. The engagement floor 110 interconnects the engagement ramp 108 and the engagement barrier wall 112. Additionally, the first and second engagement mechanisms 348, 350 are arranged relative to the disc 346 to be circumferential mirror images of one another. Therefore, the tooth 304 extending from engagement end 335 of the first engagement mechanism 348 is disposed in the chamber 372 to be the circumferential mirror image of the tooth 304 extending from the engagement end 335 of the second engagement mechanism 350. Each engagement mechanism 348, 350 is pivotably attached to the case 34 at a pivot location 340 disposed between the engagement end 335 and the release end 336.

A biasing device 318 is disposed between the wall 362 and the engagement end 335 of each engagement mechanism 348, 350. The biasing device 318 may be a spring, such as a coil spring. Each biasing device 318 applies load on the release end 336 of the engagement mechanism to pivotally bias the tooth 304 of the respective engagement mechanism 348, 350 away from the disc 346 and into the disengaged position 94. Further, a holding device 342 is operatively attached to the wall 362, proximate the biasing device 318 for each engagement mechanism 348, 350. Each holding device 342 is also operatively attached to the controller 32. The holding device 342 may be a solenoid configured to hold the release end 336 of the corresponding engagement mechanism to retain the engagement mechanism in the disengaged position 94. The solenoid may have no moving parts and be optimize for holding the engagement mechanism in the disengaged position. By way of a non-limiting example, the solenoid may only require 1.3 Watts (W) at 12 volts to keep the engagement mechanism in the disengaged position with only 14 pounds (lbs). Likewise, the holding device 342 is configured to selectively release the release end 336 of the corresponding engagement mechanism upon receiving a signal from the controller 32 to allow the engagement mechanism to pivot at the pivot location 340.

The actuator 330 is operatively attached to the case 334, proximate the engagement end 335 of each engagement mechanism 348, 350. The actuator 330 is configured to act on the engagement ends 334 of each engagement mechanism 348, 350 through a common biasing device 318, such as a spring. The biasing device 318 is configured such that the engagement mechanisms 348, 350 are pre-loaded and ready to engage the corresponding slot 384 when the tooth 304 lines up with the respective slot 384. The actuator 330 may be of high power, i.e., at least 10 W, since the actuator 330 is configured to be pulsed or otherwise used intermittently during application of the brake mechanism 358. It should be appreciated that other actuators may also be used, as known to those of skill in the art.

When the engagement mechanisms 348, 350 are in the engaged position 96, the teeth 304 are in engagement with the corresponding slots 384 to prevent rotation of the disc 346, relative to the case 34. When, for example, the input member 40 is rotating the disc 346 in the clockwise direction 76, the recessed barrier wall 92 of one of the slots 384 defined in the disc 346 is in contact with the engagement barrier wall 112 of the tooth 304 of the first engagement mechanism 348 and lash 328 is defined between the other recessed barrier wall 92 of the slot 384 and the engagement ramp 108 of the tooth 304. Likewise, the recessed barrier wall 92 of another slot 384 defined in the disc 346 is generally disposed in abutting relationship to the engagement barrier wall 112 of the tooth 304 of the second engagement mechanism 350 and lash 328 is defined between the other recessed barrier wall 92 of the slot 384 and the engagement ramp 108 of the tooth 304. Therefore, torque applied in the clockwise locking direction 76 will cause the teeth 304 to remain engaged with the disc 346. However, a small rotation in the non-locking direction, i.e., the counterclockwise locking direction 78, will allow the spring to act on the release end 336 of the engagement mechanisms 348, 350 to pivot the engagement mechanisms 348, 350 about the pivot axis such that the engagement ends 334 retract to the disengaged position. Retraction of the tooth 304 of the engagement mechanism from the corresponding slot 384 is facilitated by the taper of the engagement ramp 108 following the corresponding recessed barrier wall 92 as the disc 346 is rotated. As the engagement ramp 108 follows the recessed barrier wall 92, the engagement end 335 of the respective engagement mechanism moves radially out of the slot 384 until the engagement mechanism is held in the disengaged position. The controller 32 may be configured to sense the disengagement such that the controller 32 systematically rotates the disc 346 between the clockwise and counterclockwise directions 76, 78 until both engagement mechanisms 348, 350 have fully achieved the disengaged position 94. Therefore, the lash 328 defined between the engagement ramps 108 and the corresponding recessed barrier wall 92 is configured such that at least one engagement mechanism 348, 350 will always be able to be retracted by the corresponding engagement mechanism 348, 350 if the actuator 330 is no longer applying an actuation force to the engagement end 335.

Figure 9:
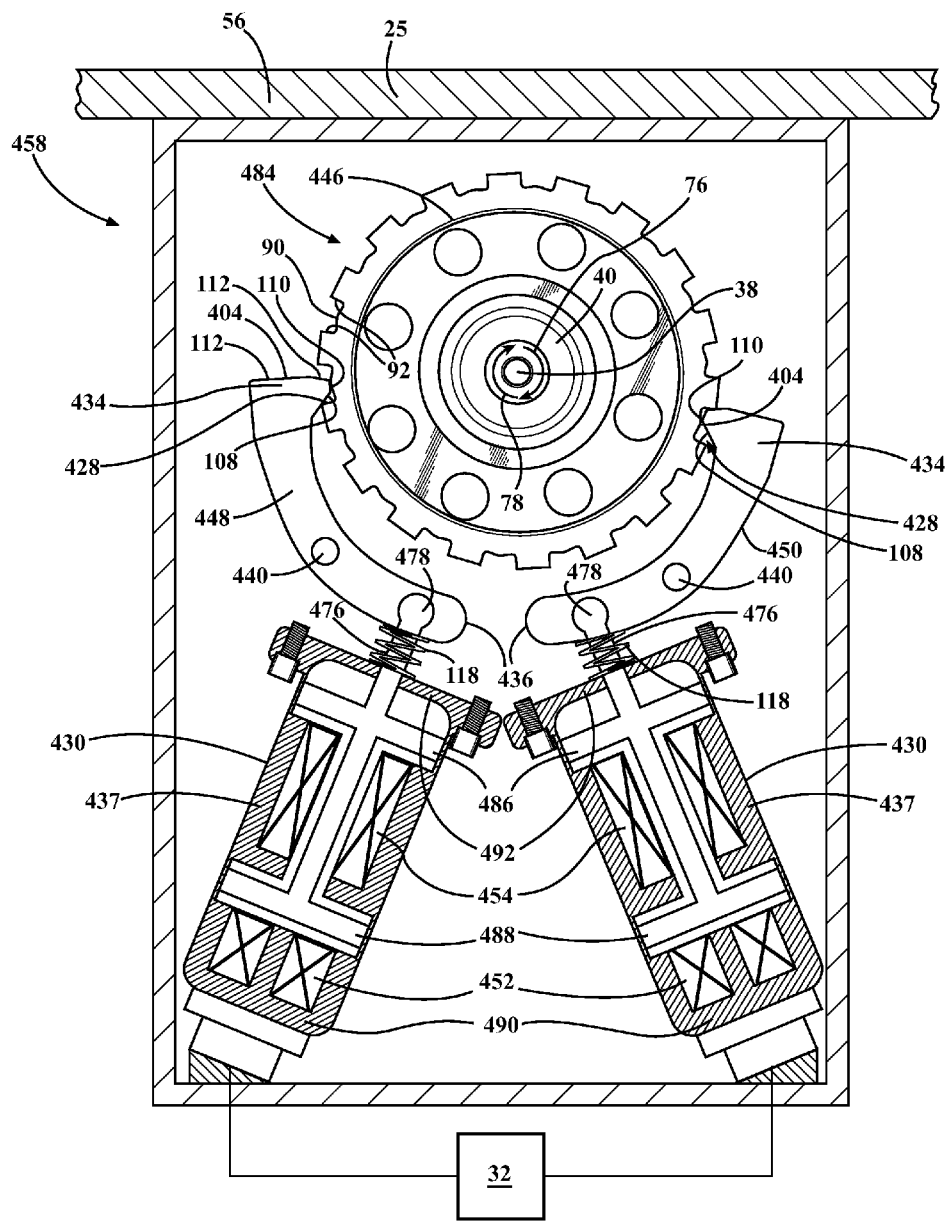
FIG. 9 is a schematic partial cross-sectional end view of yet another brake mechanism disposed in the hybrid transmission, with the brake mechanism in an engaged position.
Figure 10:
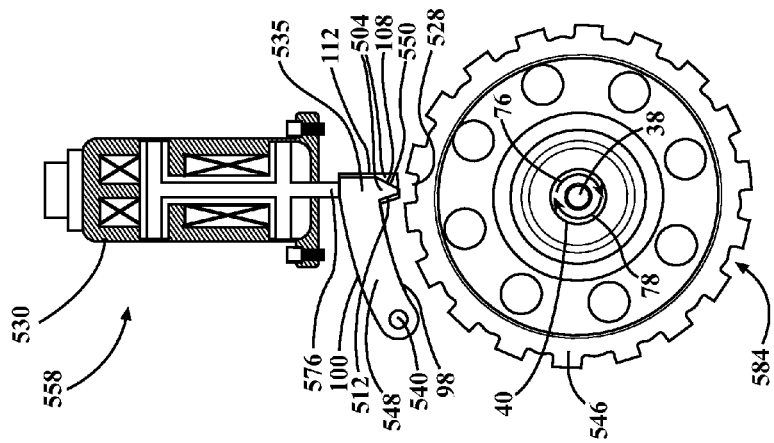
FIG. 10 is a schematic partial cross-sectional end view of another embodiment of the brake mechanism, with the brake mechanism in an engaged position.
Figure 11:
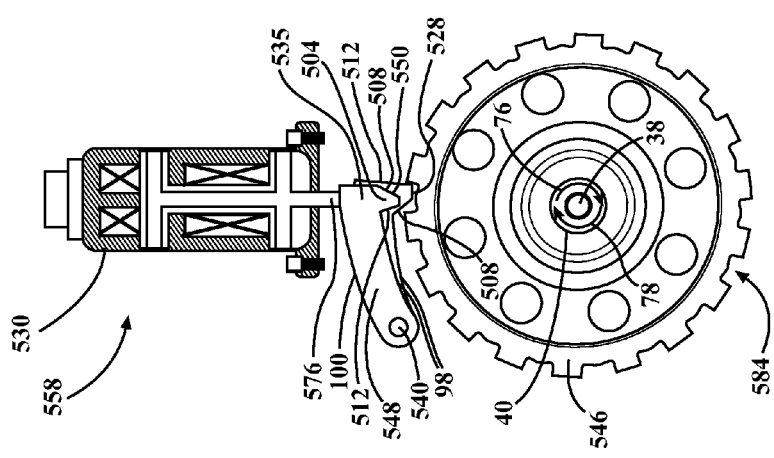
FIG. 11 is a schematic partial cross-sectional end view of the brake mechanism of FIG. 10 with the brake mechanism in a partially disengaged position.
Figure 12:
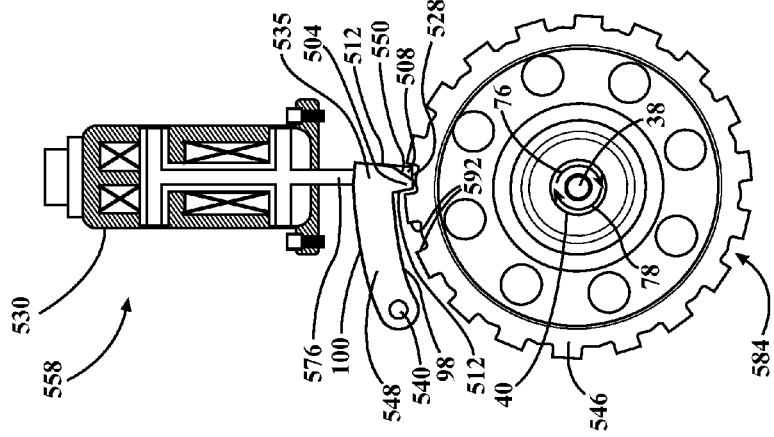
FIG. 12 is a schematic partial cross-sectional end view of the brake mechanism of FIG. 10 with the brake mechanism in a disengaged position.
Figure 13:
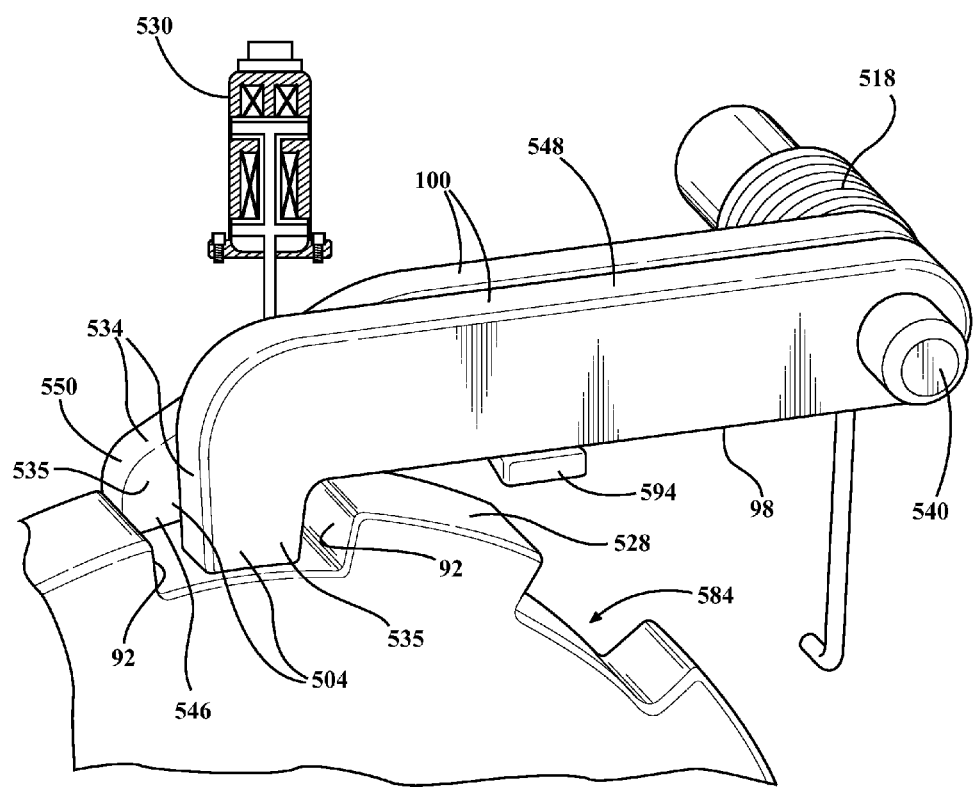
FIG. 13 is a schematic partial cross-sectional perspective end view of engagement mechanisms of the brake mechanism of FIG. 10 in the engaged position.

As shown in FIG. 9, another embodiment of the brake mechanism 458 is shown. In this embodiment, a pair of actuators 430 are operatively attached to a release end 436 of the respective first engagement mechanism 448 and second engagement mechanism 450. The actuators 430 may include a body 437 which houses a first solenoid 452 and a second solenoid 454. A connection rod 476 extends from within the body 437, generally toward the axis of rotation 38, and is operatively connected to the engagement end 434 of the respective engagement mechanism 448, 450 at an attachment end 478. Movement of the connection rod 476 away from the axis of rotation 38 causes the respective engagement mechanism 448, 450 to pivot about the pivot location 440 and move the tooth 404 at the engagement end 434 into engagement with the slot 484 of the disc 446. Likewise, movement of the connection rod 476 toward the axis of rotation 38 causes the respective engagement mechanism 448, 450 to pivot about the pivot location 440 and move the tooth 404 at the engagement end 434 out of engagement with the slot 484 of the disc 446. A first connector plate 486 and a second connector plate 488 extend from the connection rod 476 in spaced relationship to one another. The first solenoid 452 is operatively disposed between the first connection plate 486 and a first reaction plate 490. Likewise, the second solenoid 454 is operatively disposed between the second connection plate 488 and a second reaction plate 492. The first solenoid 452 is configured as a pull-in solenoid which may be of high power, i.e., at least 10 W, to pull the connection rod 476 away from the axis of rotation 38 to engage the tooth 404 with the slot 484. The second solenoid 454 is a low-power holding solenoid, i.e., approximately 1-2 W with approximately 15 lbs. Therefore, the first solenoid 452 is only required to pull the tooth 404 into engagement and the second solenoid 454 is configured to hold the engagement mechanism 450 in engagement with the slot 484 in the disc 446 at very low power without the aid of the first solenoid 452. A biasing device 118, such as a coil spring and the like, may be operatively disposed between an exterior of the body 437 and the release end 436 of the engagement mechanism 448, 450. The biasing device 118 is configured to react between the body 437 of the actuator 430 and the engagement end 434 to apply a release force against the release end 436 of the engagement mechanism 448, 450. Therefore, in the absence of the solenoids 452, 454 being actuated, the biasing device 118 reacts against the body 437 of the actuator 430 to move the connection rod 476 toward the axis of rotation 38, causing the engagement mechanism 448, 450 to pivot about the pivot location 440 and move the tooth 404 out of engagement with the slot 484. The two solenoids 452, 454 in each actuator 430 provides feedback to the controller 32 which indicates whether the engagement mechanisms 448, 450 are in the engaged position 96 or the disengaged position 94, due to a large difference in inductance. It should be appreciated, however, that the actuators are not limited to those as shown and described herein, as other actuators may also be used.

The engagement mechanisms 448, 450 may be the pawls described in the previous embodiment shown in FIG. 8, but operatively disposed such that the first engagement mechanism 448 is configured to stop rotation of the disc 446 in the counterclockwise direction 78 of rotation and the second engagement mechanism 450 is configured to stop rotation of the disc 446 in the clockwise direction 76 of rotation. Accordingly, when the engagement barrier wall 112 of the second engagement mechanism 50 is in contact with the recessed barrier wall 92 of the corresponding slot 484, lash 428 is defined between the engagement barrier wall 112 of the first engagement mechanism 448 and the recessed barrier wall 92 of the corresponding slot 484.

As shown in FIGS. 10-13, yet another embodiment of the brake mechanism 558 is shown. In this embodiment, the first engagement mechanism 548 overlays the second engagement mechanism 550 and the teeth 504 of each engagement mechanism 548, 550 may be circumferential mirror images of one another. The first and second engagement mechanisms 548, 550 are pivotally attached to the case 534 and configured to pivot about a pivot location 540. When the disc 546 is rotating in the counterclockwise direction 78, an engagement barrier wall 512 of the tooth 504 of the second engagement mechanism 550 is in contact with the recessed barrier wall 592 of the slot 584 and lash 528 is defined between the engagement barrier wall 512 of the tooth 504 of the first engagement mechanism 548 and the slot 584. Likewise, the opposite occurs when the disc 546 is rotating in the clockwise direction 76.

Each tooth 504 also includes an engagement ramp 508. Retraction of the tooth 504 of the engagement mechanism 548, 550 from the corresponding slot 584 is facilitated by a taper of the engagement ramp 508 following the corresponding recessed barrier wall 592 as the disc 546 is rotated. As the engagement ramp 508 follows the recessed barrier wall 592, an engagement end 535 of the respective engagement mechanism moves radially out of the slot 584 until the engagement mechanism is held in the disengaged position.

The connecting rod 576 is operatively attached to engagement end 534 of the first engagement mechanism 548, while a biasing device 518, such as a return spring, is operatively attached to the second engagement mechanism 550. The biasing device 518 may act on the second engagement mechanism 550 about the pivot location 540. The second engagement mechanism 550 may also include an axially extending tab 594, disposed between the engagement end 534 and the pivot location 540. The tab 594 is configured to ensure that both engagement mechanisms 548, 550 are always applied to the slot 484 at the same time. However, when the disc 546 is loading the second engagement mechanism 550, i.e., the engine 24 is attempting to rotate in the opposite direction, e.g., counterclockwise direction 78, the first engagement mechanism 548 is free and can be disengaged from the slot 584 by a solenoid 530 with very low force. Once the first engagement mechanism 548 is disengaged, any rotation of the direction in the forward direction, e.g., clockwise direction 76, will force the second engagement mechanism 550 to the disengaged position 94.

As an alternative to the electro-mechanical actuation described above, it should be appreciated that the engagement mechanisms may be actuated via a hydraulic actuator and the like.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A brake mechanism for a hybrid transmission, the brake mechanism comprising:
    a clutch unit surrounding an axis of rotation;
    wherein the clutch unit includes a first engagement mechanism and a second engagement mechanism, each surrounding the axis of rotation;
    wherein each of the first and second engagement mechanisms presents at least one tooth;
    a disc surrounding the axis of rotation, wherein the disc defines at least one slot;
    wherein each of the first and second engagement mechanisms is movable relative to the disc between a disengaged position and an engaged position;
    wherein the at least one tooth of the first engagement mechanism is configured to engage the at least one slot of the disc when in the engaged position to cease rotation of the disc in a first direction of rotation;
    wherein the at least one tooth of the second engagement mechanism is configured to engage the at least one slot of the disc when in the engaged position to cease rotation of the disc in a second direction of rotation, opposite the first direction of rotation; and
    wherein the disc is configured to rotate about the axis of rotation, relative to the clutch unit, when each of the first and second engagement mechanisms are in the disengaged position.

2. A brake mechanism, as set forth in claim 1, wherein the first and second engagement mechanisms are disposed in axially adjacent relationship to one another;
    wherein each of the first and second engagement mechanisms present an inner surface extending in generally perpendicular relationship to the axis of rotation;
    wherein the at least one tooth axially extends from the inner surface of each of the first and second engagement mechanisms; and
    wherein each of the first and second engagement mechanisms are movable axially along the axis of rotation between the engaged position and the disengaged position.

3. A brake mechanism, as set forth in claim 2, wherein the at least one tooth is further defined as a plurality of first teeth and a plurality of second teeth;
    wherein the plurality of first teeth axially extend from the inner surface of the first engagement mechanism and circumferentially surround the axis of rotation;
    wherein the plurality of second teeth axially extend from the inner surface of the second engagement mechanism and circumferentially surround the axis of rotation;
    wherein the at least one slot is further defined as a plurality of first slots and a plurality of second slots;
    wherein the plurality of first slots circumferentially surround the axis of rotation; and
    wherein the plurality of second slots circumferentially surround the axis of rotation.

4. A brake mechanism, as set forth in claim 3, wherein the disc includes a first surface and a second surface disposed opposite the first surface;
    wherein the disc is axially disposed between the first engagement mechanism and the second engagement mechanism such that the first surface faces the inner surface of the first engagement mechanism and the second surface faces the inner surface of the second engagement mechanism;
    wherein the first surface defines the plurality of first slots circumferentially surrounding the axis of rotation; and
    wherein the second surface defines the plurality of second slots circumferentially surrounding the axis of rotation.

5. A brake mechanism, as set forth in claim 4 wherein the at least one tooth extending from the inner surface of the first engagement mechanism is a circumferential mirror image of the at least one tooth extending from the inner surface of the second engagement mechanism.

6. A brake mechanism, as set forth in claim 3, wherein each of the teeth and each of the slots have a quadrilateral shape.

7. A brake mechanism, as set forth in claim 6, wherein each slot is defined by a recessed ramp, a recessed floor, and a recessed barrier wall;
    wherein the recessed ramp extends to the recessed floor in a generally diagonal direction from the respective first and second surface;
    wherein the recessed barrier wall extends generally perpendicularly from the respective first and second surface to the recessed floor from the respective first and second surface; and
    wherein the recessed floor extends between the recessed ramp and the recessed barrier wall.

8. A brake mechanism, as set forth in claim 7, wherein each tooth includes an engagement ramp, an engagement floor, and an engagement barrier wall;
    wherein the engagement ramp extends from the respective inner surface to the engagement floor in a generally diagonal direction;
    wherein the engagement barrier wall extends generally perpendicularly from the respective inner surface to the engagement floor; and
    wherein the engagement floor extends between the engagement ramp and the engagement barrier wall.

9. A brake mechanism, as set forth in claim 1, wherein the at least one tooth has a complimentary shape to the at least one slot defined in the disc.

10. A brake mechanism, as set forth in claim 1, further comprising a case defining a chamber surrounding the axis of rotation;
    wherein the first and second engagement mechanisms and the disc are disposed in the chamber;
    wherein a pressure cavity is defined between each of the first and second engagement mechanisms and the case;
    wherein the pressure cavity is configured to receive a fluid;
    wherein the first and second engagement mechanisms are configured to move relative to the case, into the engaged position, in response to an increase in pressure of the fluid within the pressure cavity; and
    wherein the first and second engagement mechanisms are configured to move relative to the case, into the disengaged position, in response to a decrease in pressure of the fluid within the pressure cavity.

11. A brake mechanism, as set forth in claim 10, further comprising a biasing device operatively disposed between each of the first and second engagement mechanisms and the case;
   wherein the biasing device is configured to move the first and second engagement mechanisms from the engaged position to the disengaged position in response to a force of the biasing device being greater than a force of the pressure of the fluid acting on a respective one of the first and second engagement mechanisms.

12. A brake mechanism for a hybrid transmission, the brake mechanism comprising:
   a clutch unit surrounding an axis of rotation;
   wherein the clutch unit includes a first engagement mechanism and a second engagement mechanism;
   wherein each of the first and second engagement mechanisms presents at least one tooth;
   a disc surrounding the axis of rotation, wherein the disc defines at least one slot;
   wherein each of the first and second engagement mechanisms is movable relative to the disc between a disengaged position and an engaged position;
   wherein the at least one tooth of the first engagement mechanism is configured to engage the at least one slot of the disc when in the engaged position to cease rotation of the disc in a first direction of rotation;
   wherein the at least one tooth of the second engagement mechanism is configured to engage the at least one slot of the disc when in the engaged position to cease rotation of the disc in a second direction of rotation, opposite the first direction of rotation; and
   wherein the disc is configured to rotate about the axis of rotation, relative to the clutch unit, when each of the first and second engagement mechanisms are in the disengaged position; and
   a case defining a chamber surrounding the axis of rotation;
   wherein the first and second engagement mechanisms and the disc are disposed in the chamber;
   wherein a pressure cavity is defined between each of the first and second engagement mechanisms and the case;
   wherein the pressure cavity is configured to receive a fluid;
   wherein the first and second engagement mechanisms are configured to move relative to the case, into the engaged position, in response to an increase in pressure of the fluid within the pressure cavity; and
   wherein the first and second engagement mechanisms are configured to move relative to the case, into the disengaged position, in response to a decrease in pressure of the fluid within the pressure cavity.

13. A brake mechanism, as set forth in claim 12, wherein each of the first and second engagement mechanism is a pawl.

14. A brake mechanism, as set forth in claim 12, wherein the disc defines a plurality of circumferentially spaced slots extending radially inwardly from an outer edge of the disc and surrounding the axis of rotation;
   wherein the first and second engagement mechanisms are operatively disposed in radially spaced relationship to the axis of rotation;
   wherein the first and second engagement mechanisms each include an engagement end and a tooth extending radially inwardly toward the axis of rotation from the engagement end;
   wherein each of the first and second engagement mechanisms is configured to pivot about a pivot location to move the tooth relative to plurality of slots between a disengaged position and an engaged position; and
   wherein the first and second engagement mechanisms are configured to be in the engaged position when the teeth are in engagement with the corresponding slots to prevent rotation of the disc.

15. A brake mechanism, as set forth in claim 14, wherein each slot is defined by a pair of recessed barrier walls and a recessed floor extending between the pair of barrier walls;
   wherein each tooth includes an engagement ramp, an engagement floor, and an engagement barrier wall;
   wherein the engagement ramp extends generally diagonally from an interior surface of the respective engagement mechanism to the engagement floor; and
   wherein the engagement barrier wall extends generally perpendicularly from the interior surface of the respective engagement mechanism to the engagement floor such that the engagement floor interconnects the engagement ramp and the engagement barrier wall; and
   wherein the first and second engagement mechanisms are configured to be in the engaged position when the recessed barrier wall of one of the slots is in contact with the engagement barrier wall of the tooth of one of the first and second engagement mechanisms and lash is defined between the other recessed barrier wall of the slot such that the disc is prevented from rotating about the axis of rotation in one of the first and second directions of rotation.

16. A brake mechanism, as set forth in claim 15, wherein the first and second engagement mechanisms are operatively disposed such that the engagement ramp and the engagement barrier wall of the first engagement mechanism are circumferentially opposite the engagement ramp and the engagement barrier wall of the second engagement mechanism;
   wherein the first engagement mechanism is configured to be in the engaged position when the respective engagement barrier wall is in contact with the recessed barrier wall of one of the slots and lash is defined between the other recessed barrier wall of the slot and the respective engagement ramp such that the disc is prevented from rotating about the axis of rotation in the first direction of rotation; and
   wherein the second engagement mechanism is configured to be in the engaged position when the engagement barrier wall is in contact with the respective recessed barrier wall of one of the slots and lash is defined between the other recessed barrier wall of the slot and the respective engagement ramp such that the disc is prevented from rotation about the axis of rotation in the second direction of rotation.

17. A brake mechanism, as set forth in claim 16, wherein the first and second engagement mechanisms are operatively disposed along the same pivot location.

18. A brake mechanism, as set forth in claim 16, wherein the first and second engagement mechanisms are not disposed along the same pivot location.

19. A brake mechanism, as set forth in claim 14, further comprising at least one actuator operatively connected to at least one of the first and second engagement mechanisms; and
   wherein the at least one actuator is configured to cause the first and second engagement mechanisms to move from the engaged position to the disengaged position.

20. A brake mechanism for a hybrid transmission, the brake mechanism comprising:
   a clutch unit surrounding an axis of rotation;
   wherein the clutch unit includes a first engagement mechanism and a second engagement mechanism disposed in axially adjacent relationship to one another;

wherein each of the first and second engagement mechanisms present an inner surface extending in generally perpendicular relationship to the axis of rotation;

wherein each of the first and second engagement mechanisms presents a plurality of teeth, axially extending from the respective inner surface, to surround the axis of rotation; and a disc surrounding the axis of rotation, wherein the disc defines a plurality of slots, surrounding the axis of rotation;

wherein each of the teeth and each of the slots have a quadrilateral shape;

wherein each slot is defined by a recessed ramp, a recessed floor, and a recessed barrier wall;

wherein the recessed ramp extends to the recessed floor in a generally diagonal direction from the respective first and second surface;

wherein the recessed barrier wall extends generally perpendicularly from the respective first and second surface to the recessed floor from the respective first and second surface; and wherein the recessed floor extends between the recessed ramp and the recessed barrier wall;

wherein each tooth includes an engagement ramp, an engagement floor, and an engagement barrier wall;

wherein the engagement ramp extends from the respective inner surface to the engagement floor in a generally diagonal direction;

wherein the engagement barrier wall extends generally perpendicularly from the respective inner surface to the engagement floor; and wherein the engagement floor extends between the engagement ramp and the engagement barrier wall;

wherein each of the first and second engagement mechanisms is axially movable relative to the disc between a disengaged position and an engaged position;

wherein the plurality of teeth of the first engagement mechanism are configured to engage the plurality of slots of the disc when in the engaged position to cease rotation of the disc in a first direction of rotation;

wherein the plurality of teeth of the second engagement mechanism are configured to engage the at least one slot of the disc when in the engaged position to cease rotation of the disc in a second direction of rotation, opposite the first direction of rotation; and wherein the disc is configured to rotate about the axis of rotation, relative to the clutch unit, when each of the first and second engagement mechanisms are in the disengaged position.

* * * * *